United States Patent
Fuldseth et al.

(10) Patent No.: US 10,091,533 B2
(45) Date of Patent: Oct. 2, 2018

(54) GENERALIZED FILTER FOR REMOVING VIDEO COMPRESSION ARTIFACTS

(71) Applicant: Cisco Technology, Inc., San Jose, CA (US)

(72) Inventors: Arild Fuldseth, Snarøya (NO); Steinar Midtskogen, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 272 days.

(21) Appl. No.: 15/182,765

(22) Filed: Jun. 15, 2016

(65) Prior Publication Data

US 2017/0244982 A1    Aug. 24, 2017

Related U.S. Application Data

(60) Provisional application No. 62/296,689, filed on Feb. 18, 2016.

(51) Int. Cl.
*H04N 19/86* (2014.01)

(52) U.S. Cl.
CPC .................. *H04N 19/86* (2014.11)

(58) Field of Classification Search
CPC ..................................... H04N 19/86
See application file for complete search history.

(56) References Cited

U.S. PATENT DOCUMENTS

| | | |
|---|---|---|
| 5,337,088 A | 8/1994 | Honjo |
| 5,367,385 A | 11/1994 | Yuan |
| 5,488,420 A | 1/1996 | Bjontegaard |
| 5,974,197 A | 10/1999 | Lee et al. |
| 6,028,967 A | 2/2000 | Kim et al. |
| 6,115,503 A | 9/2000 | Kaup |
| 6,215,425 B1 | 4/2001 | Andrews et al. |
| 6,226,050 B1 | 5/2001 | Lee |
| 6,360,024 B1 | 3/2002 | Tan et al. |
| 6,724,944 B1 | 4/2004 | Kalevo et al. |
| 6,807,317 B2 | 10/2004 | Mathew et al. |
| 7,215,823 B2 | 5/2007 | Miura et al. |
| 7,233,706 B1 | 6/2007 | Kim et al. |
| 7,239,755 B1 | 7/2007 | Kim et al. |
| 7,242,815 B2 | 7/2007 | Kalevo et al. |
| 7,277,593 B2 | 10/2007 | Kim et al. |

(Continued)

*Primary Examiner* — Zhihan Zhou
(74) *Attorney, Agent, or Firm* — Edell, Shapiro & Finnan, LLC

(57) ABSTRACT

A target sample x(i,j) of a two-dimensional array of reconstructed samples is filtered based on values of samples in a neighboring region of the target sample to produce a two-dimensional array of modified reconstructed samples, according to the equation: $y(i,j)=\text{round}(x(i,j)+g(\Sigma_{m,n\in R}a(m,n)f(x(i,j)-b(m,n)x(m,n))))$, where y(i,j) is a modified target sample value, R is the neighboring region of the target sample, a(m,n) and b(m,n) are real-valued coefficients, round(x) is a function that maps the value x to an integer value in the range $[0,2^B-1]$, B is the number of bits representing each sample of the two-dimensional array of modified reconstructed samples, f(x) and g(x) are functions, wherein (a) f(x) is a non-linear function, or (b) g(x) is a non-linear function and both a width and a height of R is more than one sample.

20 Claims, 7 Drawing Sheets

(56) References Cited

U.S. PATENT DOCUMENTS

| | | | |
|---|---|---|---|
| 7,352,812 B2 | 4/2008 | Sun et al. | |
| 7,394,945 B2 | 7/2008 | Kim et al. | |
| 7,430,337 B2* | 9/2008 | Deshpande | H04N 19/60 348/607 |
| 7,437,015 B2 | 10/2008 | Kim et al. | |
| 7,471,845 B2 | 12/2008 | Deshpande | |
| 7,496,239 B2* | 2/2009 | Kim | H04N 19/00 375/240.27 |
| 7,570,834 B2 | 8/2009 | Deshpande | |
| 7,616,833 B2 | 11/2009 | Kim et al. | |
| 8,380,001 B2 | 2/2013 | Zhou | |
| 2014/0092957 A1* | 4/2014 | MacInnis | H04N 19/61 375/240.02 |

* cited by examiner

| | | x(i, j-1) | | |
|---|---|---|---|---|
| x(i-2, j) | x(i-1, j) | x(i, j) | x(i+1, j) | x(i+2, j) |
| | | x(i, j+1) | | |

FIG.2

GENERALIZED FILTER FOR REMOVING VIDEO COMPRESSION ARTIFACTS

PRIORITY CLAIM

This application claims priority to U.S. Provisional Patent Application No. 62/296,689, filed Feb. 18, 2016, the entirety of which is incorporated herein by reference.

TECHNICAL FIELD

The present disclosure relates to video coding.

BACKGROUND

One operation performed in video coding is to correct for artifacts creating during video compression. Such a filtering operation may be performed both at a video encoder and a video decoder.

BRIEF DESCRIPTION OF THE DRAWINGS

FIG. 2 is a diagram graphically depicting a specific example of a video filter for a video decoder or video encoder, according to an example embodiment.

DESCRIPTION OF EXAMPLE EMBODIMENTS

Overview

Presented herein techniques for a generic filter function applied to pixels in a segment of a video frame. The method supports various regions of support/masks/kernels/neighborhoods for filter input. The filter can be used as an in-loop filter or as a decoder-side post-filter. A target sample $x(i,j)$ of a two-dimensional array of reconstructed samples is filtered based on values of samples in a neighboring region of the target sample to produce a two-dimensional array of modified reconstructed samples, according to the equation: $y(i,j)=\text{round}(x(i,j)+g(\Sigma_{m,n\in R}a(m,n)f(x(i,j)-b(m,n)x(m,n))))$, where $y(i,j)$ is a modified target sample value, R is the neighboring region of the target sample, $a(m,n)$ and $b(m,n)$ are real-valued coefficients, round(x) is a function that maps the value x to an integer value in the range $[0,2^B-1]$, B is the number of bits representing each sample of the two-dimensional array of modified reconstructed samples, $f(x)$ and $g(x)$ are functions, wherein (a)$f(x)$ is a non-linear function, or (b) $g(x)$ is a non-linear function and both a width and a height of R is more than one sample.

DETAILED DESCRIPTION

Figure 1:
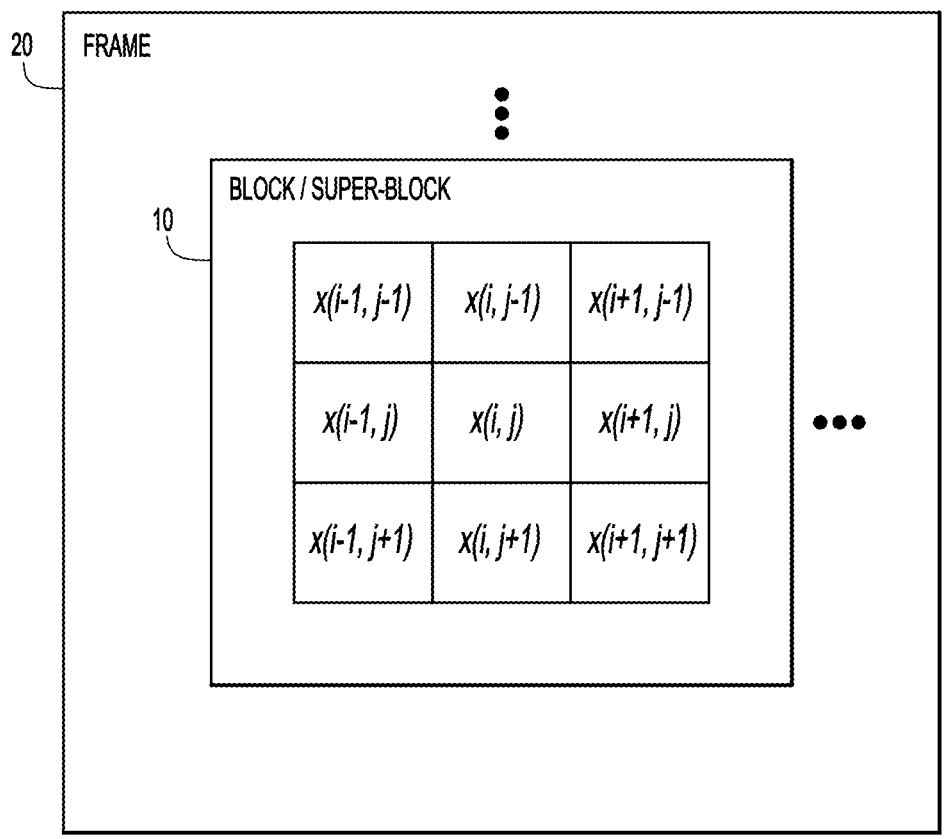
FIG. 1 is a diagram graphically depicting a generalized filter for a video decoder or video encoder, according to an example embodiment.

Reference is first to made to FIG. 1. FIG. 1 illustrates a target pixel or sample $x(i,j)$ of a two-dimensional array of reconstructed samples for a video frame, and an immediate neighborhood of 3×3 pixels of the target sample. A generalized function to modify (filter) a target sample $x(i,j)$ is:

$$y(i, j) = \text{round}\left(x(i, j) + g\left(\sum_{m,n\in R} a(m, n)f(x(i, j) - b(m, n)x(m, n))\right)\right)$$

where:
- $x(i,j)$ is the target sample value;
- $y(i,j)$ is the modified target sample value;
- R is the region of support (e.g. a 3×3 or a 5×5 neighborhood of the target sample $x(i,j)$), but not limited to the 3×3 neighborhood of FIG. 1;
- $a(m,n)$ and $b(m,n)$ are real-valued coefficients (though in some embodiments $b(m,n)=1$);
- $f(x)$ and $g(x)$ are functions, (in one embodiment, (a)$f(x)$ is a non-linear function, or (b) $g(x)$ is a non-linear function and both a width and a height of R is more than one sample); and
- round(x) is a function that maps the value x to an integer value in the range $[0,2^B-1]$ and B is the number of bits representing each sample of the two-dimensional array of modified reconstructed samples (produced by the generalized filter function described above). For 8-bit video, B=8, and the range is [0,255].

Furthermore, the filter function may include any finite precision approximation used to perform any real-valued (i.e. floating point) calculation in the equation above (e.g. 8-bit, 16-bit or 32-bit approximations) with the associated rounding errors.

As shown in FIG. 1, the target sample $x(i,j)$ and its neighboring region R may be within a block or super-block 10, and there may be multiple blocks or super-blocks of various sizes and shapes within video frame 20. Typically, blocks and super-blocks are used to define various coding modes and other video codec parameters. The filter parameters described above, however, might be adjusted on a filter block basis. The filter block partitioning of the video frame 20 may be different from any block or super-block partitioning used for e.g. coding modes in a video codec scheme. In other words, the frame may be partitioned into filter blocks for the purpose of changing filter parameters from one block to another. This includes turning the filter on and off.

Several filters can be expressed as a special case of this filter, including a Linear Finite Impulse Response (FIR) filter, adaptive low pass filters (ALFs) proposed for HEVC/H.265 and H.266 and other standards, Sample Adaptive Offset (SAO) edge offset filters in HEVC/H.265 (with a minor change to the equation above), deblocking filters in H.263, H.264, and H.265, and other filtering functions in a video codec.

Linear FIR Filter

For a linear FIR filter, $b(m,n)=1$, $f(x)=x$, $g(x)=x$. Examples of values for $a(m,n)$ for a 3×3 neighborhood are:

$a(m,n)=-0.1$ which would result in the following FIR filter expression:

$y(i,j)=\text{round}(0.2x(i,j)+0.1(x(i-1,j-1)+x(i,j-1)+x(i+1,j-1)+x(i-1,j)+x(i+1,j)+x(i-1,j+1)+x(i,j+1)+x(i+1,j+1)))$ where the target sample is weighted with 0.2 and the neighbor samples are weighted with 0.1.

De-Ringing Filter

For a de-ringing filter, $g(x)=x$, $f(x)=\text{clip}(x,-t,t)$, where the clip function is defined as:

$\text{clip}(x,u,v)=u$ if $x<u$ $\text{clip}(x,u,v)=x$ if $u \leq x \leq v$ $\text{clip}(x,u,v)=v$ if $x>v$ In one example embodiment, the region of support $R=\{x(i-1,j), x(i,j-1), x(i+1,j), x(i,j+1)\}$ and examples of values for t, $a(m,n)$ and $b(m,n)$ are:

$t=2$ $a(m,n)=-0.25$ $b(m,n)=1$

This would result in the following filter expression:

$y(i,j)=\text{round}(x(i,j)+0.25(\text{clip}(x(i-1,j)-x(i,j),-2,2)+\text{clip}(x(i+1,j)-x(i,j),-2,2)+\text{clip}(x(i,j-1)-x(i,j),-2,2)+\text{clip}(x(i,j+1)-x(i,j),-2,2)))$.

Figure 2:
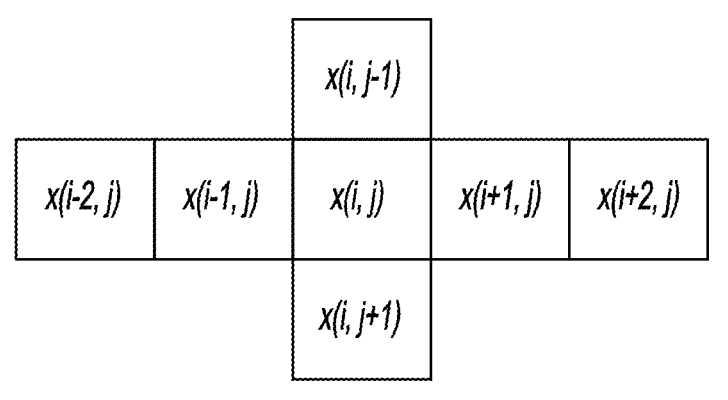

FIG. 2 illustrates another example of a de-ringing filter in which the region of support $R=x(i-2,j), x(i-1,j), x(i,j-1), x(i,j+1), x(i+1,j), x(i+2,j)$. Example values for t, $a(m,n)$ and $b(m,n)$ are:

$t=1, 2$ or $4$ $a(m,n)=-4/16$ for $(m,n)=(i,j-1)$ or $(m,n)=(,j+1)$, $a(m,n)=-3/16$ for $(m,n)=(i-1,j)$ or $(m,n)=(i+1,j)$, $a(m,n)=-1/16$ for $(m,n)=(i-2,j)$ or $(m,n)=(i+2,j)$, $b(m,n)=1$ This results in the following filter expression:

$y(i,j)=x(i,j)+(4*\text{clip}(x(i,j-1)-x(i,j), -t,t)+\text{clip}(x(i-2,j)-x(i,j), -t,t)+3*\text{clip}(x(i-1,j)-x(i,j), -t,t)+3*\text{clip}(x(i,j+1)-x(i,j), -t,t)+\text{clip}(x(i,j+2)-x(i,j), -t,t)+4*\text{clip}(x(i,j+1)-x(i,j), -t, t))/16$ HEVC/H.265 Deblocking Filter—Normal Mode When the above-mentioned general filter function is applied for an HEVC/H.265 deblocking filter, the parameters of the filter are as follows:

$b(m,n)=1, f(x)=x, g(x)=\text{clip}(x,-t,t), R=\{x(i-1,j), x(i,j), x(i+1,j), x(i+2,j)\}$ $a(i-1,j)=-3/16, a(i,j)=9/16, a(i+1,j)=-9/16, a(i+2,j)=3/16$ This results in the following filter expression:

$y(i,j)=\text{round}(x(i,j)+\text{clip}((3x(i-1,j)-9x(i,j)+9x(i+1,j)-3x(i+2,j))/16,-t,t))$, where t is dependent on the quantization parameter and has values in the range [0,25].

Figure 3A:
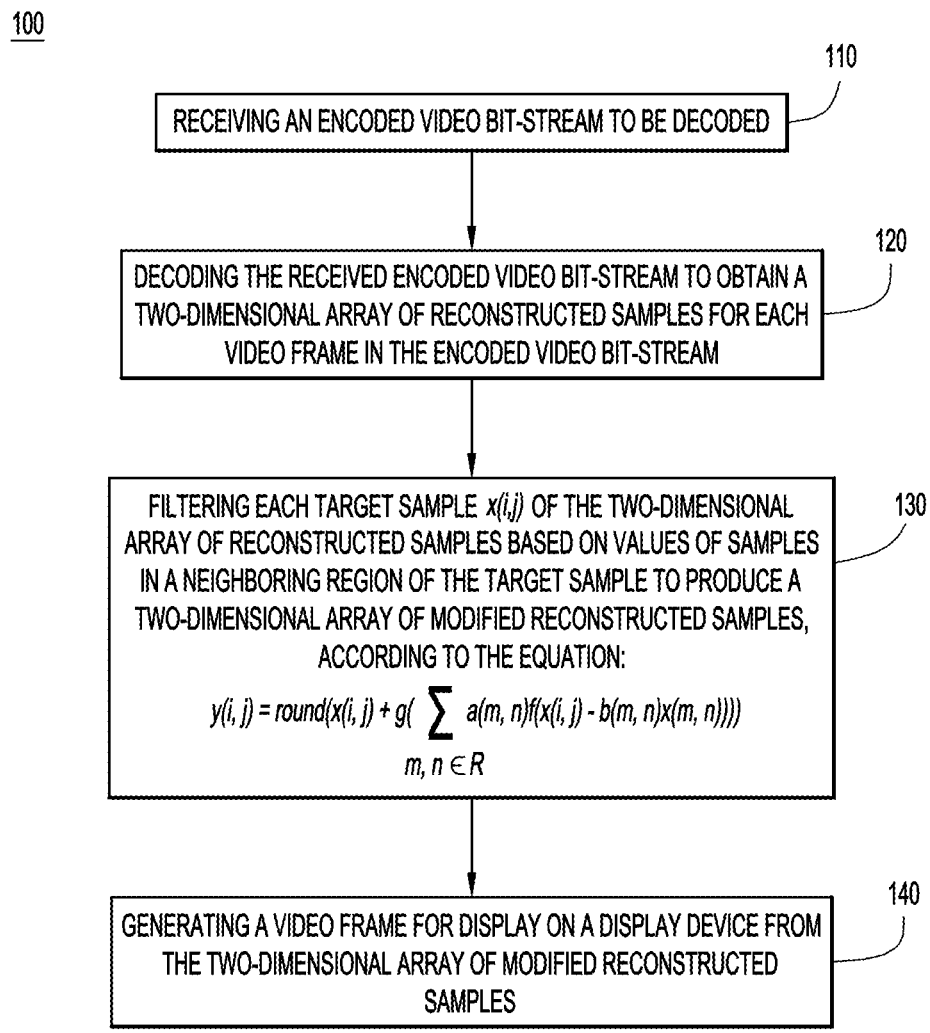
FIG. 3A is a flow chart illustrating a process performed by a video decoder according to an example embodiment.

Turning now to FIG. 3A, a flow chart is shown for a process 200 for performing the filtering operations described above at the video decoding side. At 110, an encoded video bit-stream to be decoded is received. The video bit-stream may be obtained from a storage media or received in a transmission from another device. At 120, the received encoded video bit-stream is decoded to obtain a two-dimensional array of reconstructed samples for each video frame in the encoded video bit-stream. At 130, each target sample $x(i, j)$ of the two-dimensional array of reconstructed samples is filtered based on values of samples in a neighboring region of the target sample to produce a two-dimensional array of modified reconstructed samples, according to the equation:

$$y(i, j) = \text{round}\left(x(i, j) + g\left(\sum_{m,n \in R} a(m, n) f(x(i, j) - b(m, n) x(m, n))\right)\right)$$

where y(i,j) is a modified target sample value, R is the neighboring region of the target sample, $a(m,n)$ and $b(m,n)$ are real-valued coefficients, round(x) is a function that maps the value x to an integer value in the range $[0,2^B-1]$, B is the number of bits representing each sample of the two-dimensional array of modified reconstructed samples, $f(x)$ and $g(x)$ are functions, wherein (a) $f(x)$ is a non-linear function, or (b) $g(x)$ is a non-linear function and both a width and a height of R is more than one sample.

As described above, in one embodiment, $g(x)=x$, and $f(x)=\text{clip}(x,-t,t)$, where $\text{clip}(x,-t,t)$ is defined above. In addition, t in the clip function may be adjusted on a frame level basis or block level basis.

The enabling and disabling of the filtering may be made on a frame level basis or block level basis. In addition, a filter block size may be adjusted.

At 140, a video frame (an ultimately a sequence of video frames comprising a video signal) is generated for display from the two-dimensional array of modified reconstructed samples.

Figure 3B:
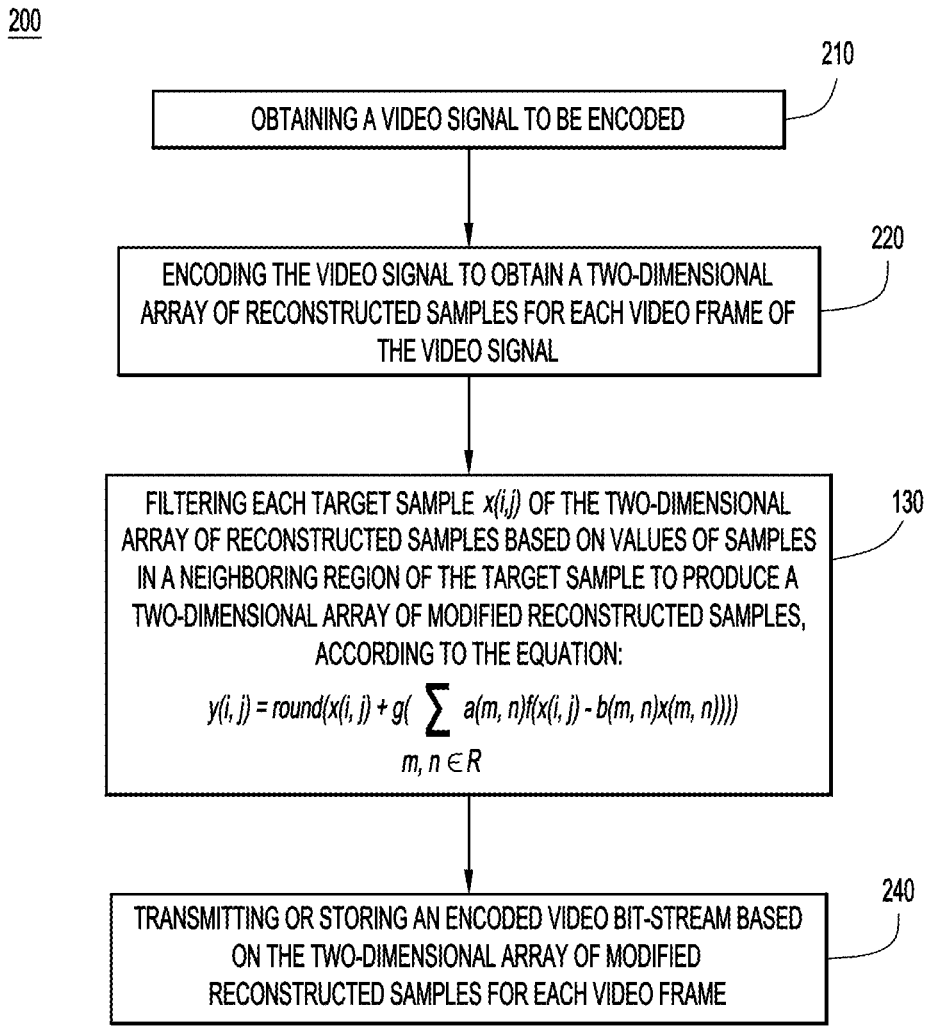
FIG. 3B is a flow chart illustrating process performed by a video encoder according to an example embodiment.

Referring now to FIG. 3B, a flow chart is shown for a process 200 for employing the filtering techniques described herein at an encoding side. At 210, a video signal to be encoded is obtained. At 220, the video signal is encoded to obtain/produce a two-dimensional array of reconstructed samples for each video frame of the video signal. At 230, each target sample $x(i,j)$ of the two-dimensional array of reconstructed samples is filtered based on values of samples in a neighboring region of the target sample to produce a two-dimensional array of modified reconstructed samples, according to the equation:

$$y(i, j) = \text{round}\left(x(i, j) + g\left(\sum_{m,n \in R} a(m, n) f(x(i, j) - b(m, n) x(m, n))\right)\right)$$

where y(i,j) is a modified target sample value, R is the neighboring region of the target sample, $a(m,n)$ and $b(m,n)$ are real-valued coefficients, round(x) is a function that maps the value x to an integer value in the range $[0,2^B-1]$, B is the number of bits representing each sample of the two-dimensional array of modified reconstructed samples, $f(x)$ and $g(x)$ are functions, and at least one of $f(x)$ and $g(x)$ is a non-linear function, wherein (a) $f(x)$ is a non-linear function, or (b) $g(x)$ is a non-linear function and both a width and a height of R is more than one sample.

As described above, in one embodiment, $g(x)=x$, and $f(x)=\text{clip}(x,-t,t)$, where $\text{clip}(x,-t,t)$ is defined above. In addition, t in the clip function may be adjusted on a frame level basis or block level basis.

The enabling and disabling of the filtering may be made on a frame level basis or block level basis. In addition, a filter block size may be adjusted.

At 240, an encoded video bit-stream is transmitted or stored based on the two-dimensional array of modified reconstructed samples for each video frame.

Figure 4:
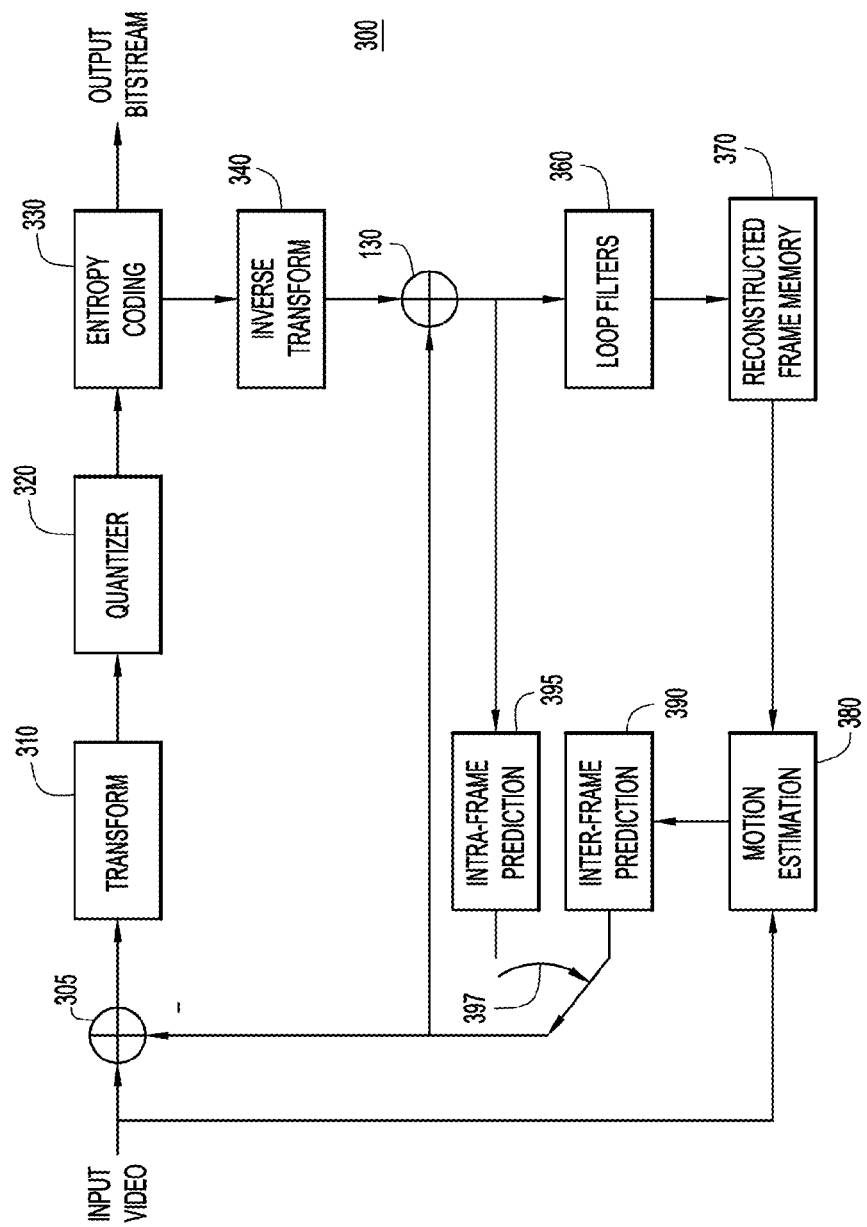
FIG. 4 is a block diagram of a video encoder configured to use the generalized filtering techniques presented herein, according to an example embodiment.

Referring first to FIG. 4 a block diagram of a video encoder is shown at reference numeral 300. The video encoder 300 is configured to perform the generalized filter techniques presented herein. The video encoder 300 includes a subtractor 305, a transform unit 310, a quantizer unit 320, an entropy coding unit 330, an inverse transform unit 340, an adder 350, one or more loop filters 360, a reconstructed frame memory 370, a motion estimation unit 380, an inter-frame prediction unit 390, an intra-frame prediction unit 395 and a switch 397.

A current frame (input video) as well as a prediction frame are input to a subtractor 305. The subtractor 305 is provided with input from either the inter-frame prediction unit 390 or intra-frame prediction unit 395, the selection of which is controlled by switch 397. Intra-prediction processing is selected for finding similarities within the current image frame, and is thus referred to as "intra" prediction. Motion compensation has a temporal component and thus involves analysis between successive frames that is referred to as "inter" prediction. The motion estimation unit 380 supplies a motion estimation output as input to the inter-frame prediction unit 390. The motion estimation unit 380 receives as input the input video and an output of the reconstructed frame memory 370.

The subtractor 305 subtracts the output of the switch 397 from the pixels of the current frame, prior to being subjected to a two dimensional transform process by the transform unit 310 to produce transform coefficients. The transform coefficients are then subjected to quantization by quantizer unit 320 and then supplied to entropy coding unit 330. Entropy coding unit 330 applies entropy encoding in order to remove redundancies without losing information, and is referred to as a lossless encoding process. Subsequently, the encoded data is arranged in network packets via a packetizer (not shown), prior to be transmitted in an output bit stream.

The output of the quantizer unit 320 is also applied to the inverse transform unit 340 and used for assisting in prediction processing. The adder 350 adds the output of the inverse transform unit 340 and an output of the switch 397 (either the output of the inter-frame prediction unit 390 or the intra-frame prediction unit 395). The output of the adder 350 is supplied to the input of the intra-frame prediction unit 395 and to one or more loop filters 360 which suppress some of the sharpness in the edges to improve clarity and better support prediction processing. One of the loop filters 360 may configured as described above in connection with FIGS. 1, 2 and 3B. It can be applied before, after or in between any other loop filters. The output of the loop filters 360 is applied to a reconstructed frame memory 370 that holds the processed image pixel data in memory for use in subsequent motion processing by motion estimation block 380.

Figure 5:
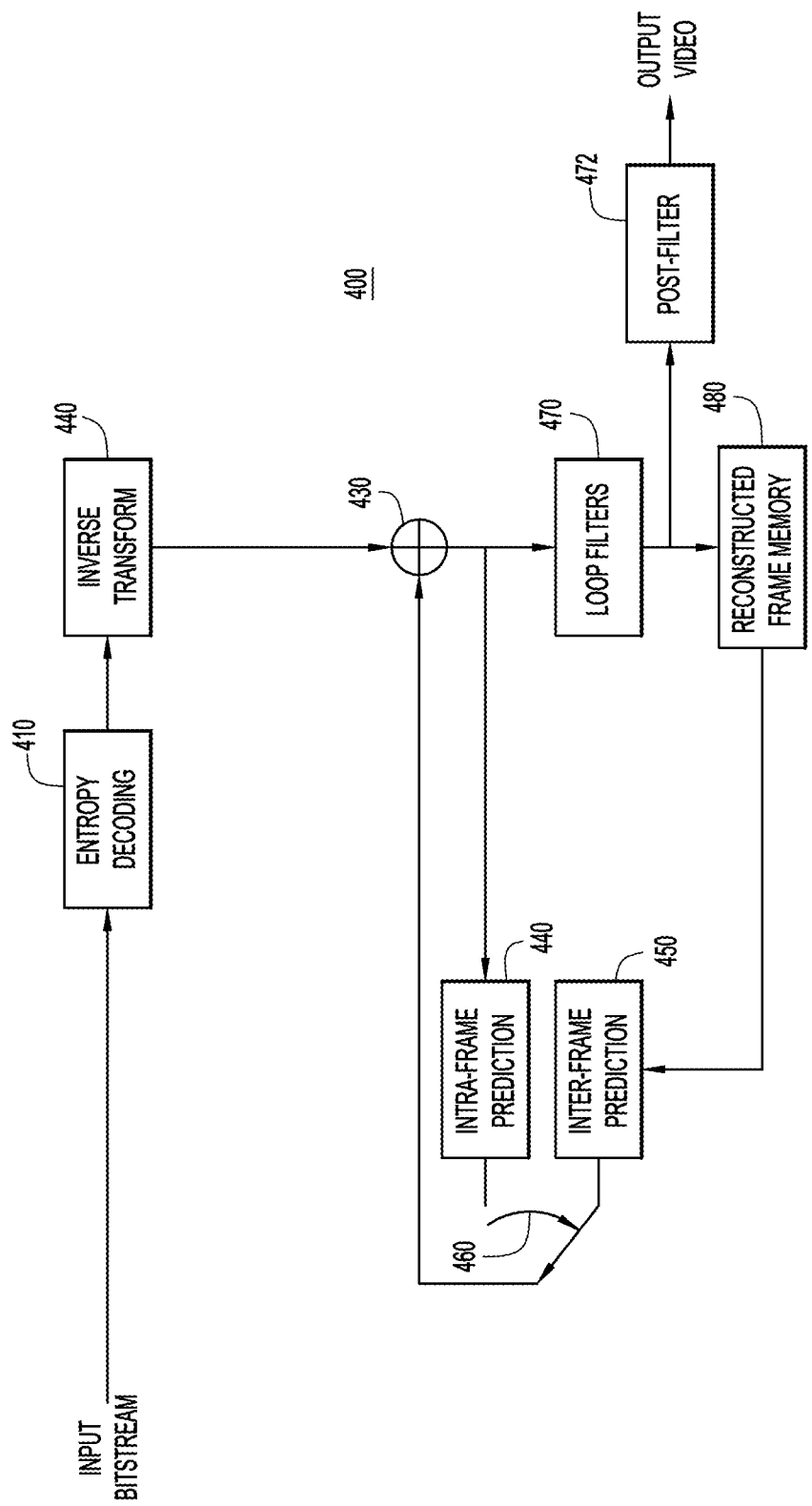
FIG. 5 is a block diagram of a video decoder configured to use generalized filter techniques presented herein, according to an example embodiment.

Turning to FIG. 5, a block diagram of a video decoder is shown at reference numeral 400. The video decoder 400 is configured to perform the generalized filter techniques presented herein. The video decoder 400 includes an entropy decoding unit 410, an inverse transform unit 420, an adder 430, an intra-frame prediction unit 440, an inter-frame prediction unit 450, a switch 460, one or more loop filters 470 and a reconstructed frame memory 480. One of the loop filters 470 may be configured as described above in connection with FIGS. 1, 2 and 3A. The order of the filters must agree with the order used in the encoder. In addition, a post-filter 472 is shown in FIG. 5 which may be configured as described above in connection with FIG. 1. The entropy decoding unit 40 performs entropy decoding on the received input bitstream to produce quantized transform coefficients which are applied to the inverse transform unit 420. The inverse transform unit 420 applies two-dimensional inverse transformation on the quantized transform coefficients to output a quantized version of the difference samples. The output of the inverse transform unit 420 is applied to the adder 430. The adder 430 adds to the output of the inverse transform unit 420 an output of either the intra-frame prediction unit 440 or inter-frame prediction unit 450. The loop filters 470 operate similar to that of the loop filters 460 in the video encoder 400 of FIG. 4. An output video image is taken at the output of the loop filters 470.

The video encoder 300 of FIG. 4 and the video decoder 400 of FIG. 5 may be implemented by digital logic gates in an integrated circuit (e.g., by an application specific integrated circuit) or by two or more separate logic devices. Alternatively, the video encoder 300 and video decoder 400 may be implemented by software executed by one or more processors, as described further in connection with FIG. 6, below.

Each of the functional blocks in FIGS. 4 and 5 are executed for each coding block, prediction block, or transform block.

Figure 6:
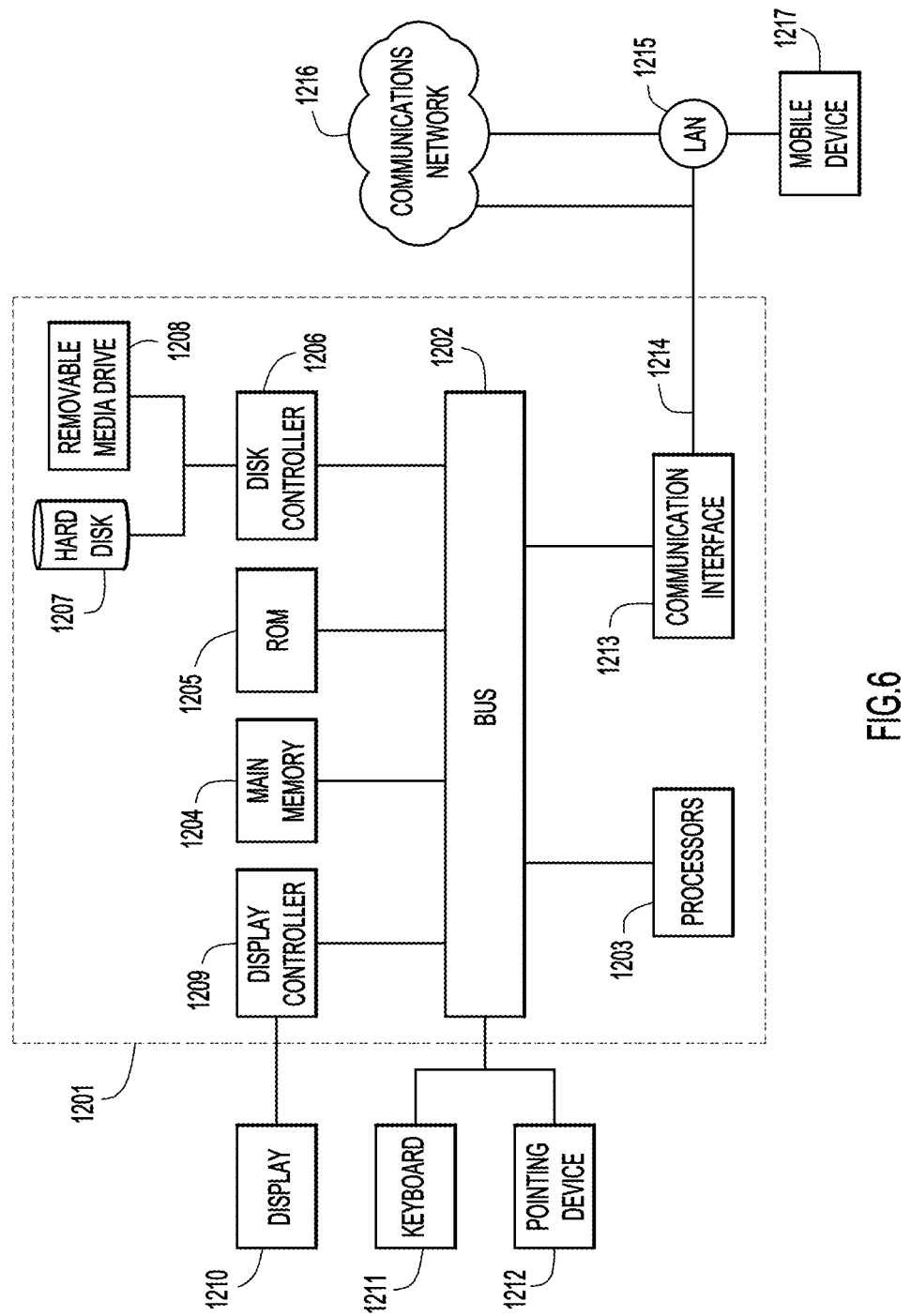
FIG. 6 is a block diagram of a computing system in which the video encoding and/or video decoding operations may be performed, according to an example embodiment.

FIG. 6 illustrates a computer system 1201 upon which an embodiment may be implemented. The computer system 1201 may be programmed to implement a computer based device, such as a video conferencing endpoint or any device includes a video encoder or decoder for processing real time video images. The computer system 1201 includes a bus 1202 or other communication mechanism for communicating information, and a processor 1203 coupled with the bus 1202 for processing the information. While the figure shows a signal block 1203 for a processor, it should be understood that the processors 1203 represent a plurality of processing cores, each of which can perform separate processing. The computer system 1201 also includes a main memory 1204, such as a random access memory (RAM) or other dynamic storage device (e.g., dynamic RAM (DRAM), static RAM (SRAM), and synchronous DRAM (SD RAM)), coupled to the bus 1202 for storing information and instructions to be executed by processor 1203. In addition, the main memory 1204 may be used for storing temporary variables or other intermediate information during the execution of instructions by the processor 1203.

The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 1201 may also include a display controller 1209 coupled to the bus 1202 to control a display 1210, such as a cathode ray tube (CRT), for displaying information to a computer user. The computer system 1201 includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1201, for driving a device or devices for implementing the techniques presented herein, and for enabling the computer system 1201 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a wired or wireless network interface card to attach to any packet switched (wired or wireless) LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local are network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Thus, in one form, a method is provided comprising: receiving an encoded video bit-stream to be decoded; decoding the received encoded video bit-stream to obtain a two-dimensional array of reconstructed samples for each video frame in the encoded video bit-stream; filtering each target sample x(i,j) of the two-dimensional array of reconstructed samples based on values of samples in a neighboring region of the target sample to produce a two-dimensional array of modified reconstructed samples, according to the equation:

$$y(i, j) = \text{round}\left(x(i, j) + g\left(\sum_{m,n \in R} a(m, n) f(x(i, j) - b(m, n) x(m, n))\right)\right)$$

where y(i,j) is a modified target sample value, R is the neighboring region of the target sample, a(m,n) and b(m,n) are real-valued coefficients, round(x) is a function that maps the value x to an integer value in the range $[0, 2^B - 1]$, B is the number of bits representing each sample of the two-dimensional array of modified reconstructed samples, f(x) and g(x) are functions, wherein (a) f(x) is a non-linear function, or (b) g(x) is a non-linear function and both a width and a height of R is more than one sample.

In another form, a method is provided comprising: obtaining a video signal to be encoded; encoding the video signal to obtain a two-dimensional array of reconstructed samples for each video frame of the video signal; filtering each target sample x(i,j) of the two-dimensional array of reconstructed samples based on values of samples in a neighboring region of the target sample to produce a two-dimensional array of modified reconstructed samples, according to the equation:

$$y(i, j) = \text{round}\left(x(i, j) + g\left(\sum_{m,n \in R} a(m, n) f(x(i, j) - b(m, n) x(m, n))\right)\right)$$

where y(i,j) is a modified target sample value, R is the neighboring region of the target sample, a(m,n) and b(m,n) are real-valued coefficients, round(x) is a function that maps the value x to an integer value in the range $[0,2^B-1]$, B is the number of bits representing each sample of the two-dimensional array of modified reconstructed samples, f(x) and g(x) are functions, wherein (a) f(x) is a non-linear function, or (b) g(x) is a non-linear function and both a width and a height of R is more than one sample; and transmitting or storing an encoded video bit-stream based on the on the two-dimensional array of modified reconstructed samples for each video frame.

In still another form, one or more non-transitory computer readable storage media are provided encoded with software comprising computer executable instructions and when the software is executed operable to perform operations comprising: receiving an encoded video bit-stream to be decoded; decoding the received encoded video bit-stream to obtain a two-dimensional array of reconstructed samples for each video frame in the encoded video bit-stream; filtering each target sample x(i,j) of the two-dimensional array of reconstructed samples based on values of samples in a neighboring region of the target sample to produce a two-dimensional array of modified reconstructed samples, according to the equation:

$$y(i, j) = \text{round}\left(x(i, j) + g\left(\sum_{m,n \in R} a(m, n) f(x(i, j) - b(m, n) x(m, n))\right)\right)$$

where y(i,j) is a modified target sample value, R is the neighboring region of the target sample, a(m,n) and b(m,n) are real-valued coefficients, round(x) is a function that maps the value x to an integer value in the range $[0,2^B-1]$, B is the number of bits representing each sample of the two-dimensional array of modified reconstructed samples, f(x) and g(x) are functions, wherein (a) f(x) is a non-linear function, or (b) g(x) is a non-linear function and both a width and a height of R is more than one sample.

In yet another form, an apparatus is provided comprising: a communication interface configured to receive an encoded video bit-stream to be decoded; and a processor coupled to the communication interface, the processor configured to: decode the received encoded video bit-stream to obtain a two-dimensional array of reconstructed samples for each video frame in the encoded video bit-stream; filter each target sample x(i,j) of the two-dimensional array of reconstructed samples based on values of samples in a neighboring region of the target sample to produce a two-dimensional array of modified reconstructed samples, according to the equation:

$$y(i, j) = \text{round}\left(x(i, j) + g\left(\sum_{m,n \in R} a(m, n) f(x(i, j) - b(m, n) x(m, n))\right)\right)$$

where y(i,j) is a modified target sample value, R is the neighboring region of the target sample, a(m,n) and b(m,n) are real-valued coefficients, round(x) is a function that maps the value x to an integer value in the range $[0,2^B-1]$, B is the number of bits representing each sample of the two-dimensional array of modified reconstructed samples, f(x) and g(x) are functions, wherein (a) f(x) is a non-linear function, or (b) g(x) is a non-linear function and both a width and a height of R is more than one sample.

In still another form, an apparatus is provided comprising: a communication interface configured to cause an encoded video bit-stream to be transmitted (or stored); and a processor configured to: obtain a video signal to be encoded; encode the video signal to obtain a two-dimensional array of reconstructed samples for each video frame of the video signal; filter each target sample x(i,j) of the two-dimensional array of reconstructed samples based on values of samples in a neighboring region of the target sample to produce a two-dimensional array of modified reconstructed samples, according to the equation:

$$y(i, j) = \text{round}\left(x(i, j) + g\left(\sum_{m,n \in R} a(m, n) f(x(i, j) - b(m, n) x(m, n))\right)\right)$$

where y(i,j) is a modified target sample value, R is the neighboring region of the target sample, a(m,n) and b(m,n) are real-valued coefficients, round(x) is a function that maps the value x to an integer value in the range $[0,2^B-1]$, B is the number of bits representing each sample of the two-dimensional array of modified reconstructed samples, f(x) and g(x) are functions, wherein (a) f(x) is a non-linear function, or (b) g(x) is a non-linear function and both a width and a height of R is more than one sample; and cause the encoded video bit-stream generated based on the on the two-dimensional array of modified reconstructed samples for each video frame, to be transmitted or stored.

In yet another form, one or more non-transitory computer readable storage media are provided encoded with software comprising computer executable instructions and when the software is executed operable to perform operations comprising: obtaining a video signal to be encoded; encoding the video signal to obtain a two-dimensional array of reconstructed samples for each video frame of the video signal; filtering each target sample x(i,j) of the two-dimensional array of reconstructed samples based on values of samples in a neighboring region of the target sample to produce a two-dimensional array of modified reconstructed samples, according to the equation:

$$y(i, j) = \text{round}\left(x(i, j) + g\left(\sum_{m,n \in R} a(m, n) f(x(i, j) - b(m, n) x(m, n))\right)\right)$$

where y(i,j) is a modified target sample value, R is the neighboring region of the target sample, a(m,n) and b(m,n) are real-valued coefficients, round(x) is a function that maps the value x to an integer value in the range $[0,2^B-1]$, B is the number of bits representing each sample of the two-dimensional array of modified reconstructed samples, f(x) and g(x) are functions, wherein (a) f(x) is a non-linear function, or (b) g(x) is a non-linear function and both a width and a height of R is more than one sample; and transmitting or storing an encoded video bit-stream based on the on the two-dimensional array of modified reconstructed samples for each video frame.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    receiving an encoded video bit-stream to be decoded;
    decoding the received encoded video bit-stream to obtain a two-dimensional array of reconstructed samples for each video frame in the encoded video bit-stream;
    filtering each target sample x(i,j) of the two-dimensional array of reconstructed samples based on values of samples in a neighboring region of the target sample to produce a two-dimensional array of modified reconstructed samples, according to the equation:

$$y(i,j)=\text{round}(x(i,j)+g(\Sigma_{m,n \in R}a(m,n)f(x(i,j)-b(m,n)x(m,n))))$$

where y(i,j) is a modified target sample value, R is the neighboring region of the target sample, a(m,n) and b(m,n) are real-valued coefficients, round(x) is a function that maps the value x to an integer value in the range $[0,2^B-1]$, B is the number of bits representing each sample of the two-dimensional array of modified reconstructed samples, f(x) and g(x) are functions, wherein (a)f(x) is a non-linear function, or (b) g(x) is a non-linear function and both a width and a height of R is more than one sample.

2. The method of claim 1, wherein at least one of f(x) and g(x) is a clip function.

3. The method of claim 2, wherein g(x)=x, and f(x)=clip(x,-t,t), where:

$\text{clip}(x,u,v)=u$ if $x<u$ $\text{clip}(x,u,v)=x$ if $u \leq x \leq v$ $\text{clip}(x,u,v)=v$ if $x>v$ and t is a real value.

4. The method of claim 3, further comprising adjusting t on a frame level basis or block level basis.

5. The method of claim 1, wherein both f(x) and g(x) are non-linear functions.

6. The method of claim 1, further comprising enabling and disabling the filtering on a frame level basis or block level basis.

7. The method of claim 6, further comprising adjusting a filter block size.

8. A method comprising:
    obtaining a video signal to be encoded;
    encoding the video signal to obtain a two-dimensional array of reconstructed samples for each video frame of the video signal;
    filtering each target sample x(i,j) of the two-dimensional array of reconstructed samples based on values of samples in a neighboring region of the target sample to produce a two-dimensional array of modified reconstructed samples, according to the equation:

$$y(i,j)=\text{round}(x(i,j)+g(\Sigma_{m,n \in R}a(m,n)f(x(i,j)-b(m,n)x(m,n))))$$

where y(i,j) is a modified target sample value, R is the neighboring region of the target sample, a(m,n) and b(m,n) are real-valued coefficients, round(x) is a function that maps the value x to an integer value in the range $[0,2^B-1]$, B is the number of bits representing each sample of the two-dimensional array of modified reconstructed samples, f(x) and g(x) are functions, wherein (a)f(x) is a non-linear function, or (b) g(x) is a non-linear function and both a width and a height of R is more than one sample; and
    transmitting or storing an encoded video bit-stream based on the two-dimensional array of modified reconstructed samples for each video frame.

9. The method of claim 8, wherein at least one of f(x) and g(x) is a clip function.

10. The method of claim 9, wherein g(x)=x, and f(x)=clip(x,-t,t), where:

$\text{clip}(x,u,v)=u$ if $x<u$ $\text{clip}(x,u,v)=x$ if $u \leq x \leq v$ $\text{clip}(x,u,v)=v$ if $x>v$ and t is a real value.

11. The method of claim 10, further comprising adjusting t on a frame level basis or block level basis.

12. The method of claim 10, wherein both f(x) and g(x) are non-linear functions.

13. The method of claim 8, further comprising enabling and disabling the filtering on a frame level basis or block level basis.

14. The method of claim 13, further comprising adjusting a filter block size.

15. One or more non-transitory computer readable storage media encoded with software comprising computer executable instructions and when the software is executed operable to perform operations comprising:
    receiving an encoded video bit-stream to be decoded;
    decoding the received encoded video bit-stream to obtain a two-dimensional array of reconstructed samples for each video frame in the encoded video bit-stream;
    filtering each target sample x(i,j) of the two-dimensional array of reconstructed samples based on values of samples in a neighboring region of the target sample to produce a two-dimensional array of modified reconstructed samples, according to the equation:

$$y(i,j) = \text{round}\left(x(i,j) + g\left(\sum_{m,n \in R} a(m,n)f(x(i,j) - b(m,n)x(m,n))\right)\right)$$

where y(i,j) is a modified target sample value, R is the neighboring region of the target sample, a(m,n) and b(m,n) are real-valued coefficients, round(x) is a function that maps the value x to an integer value in the range $[0,2^B-1]$, B is the number of bits representing each sample of the two-dimensional array of modified reconstructed samples, f(x) and g(x) are functions, wherein (a) f(x) is a non-linear function, or (b)

g(x) is a non-linear function and both a width and a height of R is more than one sample.

16. The non-transitory computer readable storage media of claim 15, wherein at least one of f(x) and g(x) is a clip function.

17. The non-transitory computer readable storage media of claim 16, wherein g(x)=x, and f(x)=clip(x,−t,t), where:

clip(x,u,v)=u if x<u clip(x,u,v)=x if u≤x≤v clip(x,u,v)=v if x>v and t is a real value.

18. The non-transitory computer readable storage media of claim 17, further comprising instructions operable for adjusting t on a frame level basis or block level basis.

19. An apparatus comprising:
a communication interface configured to receive an encoded video bit-stream to be decoded; and
a processor coupled to the communication interface, the processor configured to:
decode the received encoded video bit-stream to obtain a two-dimensional array of reconstructed samples for each video frame in the encoded video bit-stream;
filter each target sample x(i,j) of the two-dimensional array of reconstructed samples based on values of samples in a neighboring region of the target sample to produce a two-dimensional array of modified reconstructed samples, according to the equation:

$$y(i, j) = \text{round}\left(x(i, j) + g\left(\sum_{m,n \in R} a(m, n) f(x(i, j) - b(m, n) x(m, n))\right)\right)$$

where y(i,j) is a modified target sample value, R is the neighboring region of the target sample, a(m,n) and b(m,n) are real-valued coefficients, round(x) is a function that maps the value x to an integer value in the range $[0, 2^B-1]$, B is the number of bits representing each sample of the two-dimensional array of modified reconstructed samples, f(x) and g(x) are functions, wherein (a) f(x) is a non-linear function, or (b) g(x) is a non-linear function and both a width and a height of R is more than one sample.

20. The apparatus of claim 19, wherein at least one of f(x) and g(x) is a clip function.

* * * * *

UNITED STATES PATENT AND TRADEMARK OFFICE
CERTIFICATE OF CORRECTION

PATENT NO. : 10,091,533 B2  
APPLICATION NO. : 15/182765  
DATED : October 2, 2018  
INVENTOR(S) : Arild Fuldseth et al.

Page 1 of 1

It is certified that error appears in the above-identified patent and that said Letters Patent is hereby corrected as shown below:

In the Claims

Claim 11, Column 12, Line 34, please replace "ton" with --*t* on--

Signed and Sealed this
Twenty-second Day of January, 2019

Andrei Iancu
*Director of the United States Patent and Trademark Office*